Figure 1:
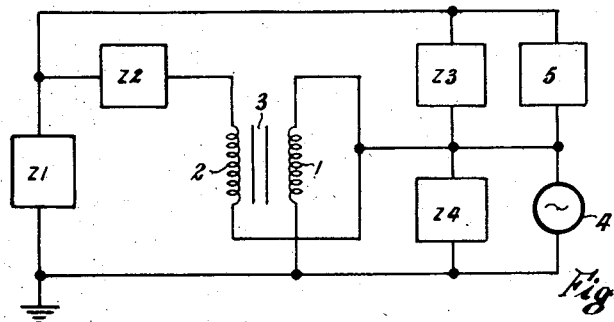

May 29, 1951 J. W. WHITELEY 2,554,932
ELECTRICAL BRIDGE NETWORK
Filed Oct. 25, 1948 3 Sheets-Sheet 1

INVENTOR
JOSEPH W. WHITELEY
By Ralph B. Stewart
Attorney

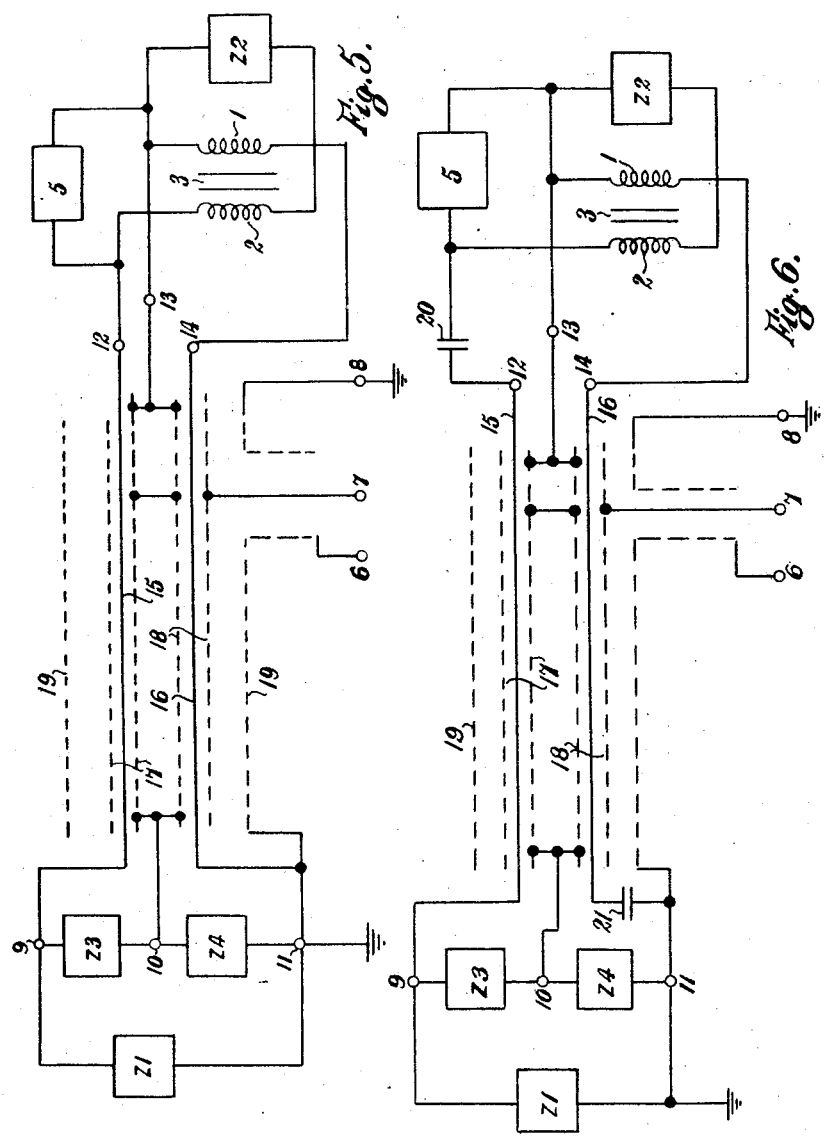

May 29, 1951  J. W. WHITELEY  2,554,932
ELECTRICAL BRIDGE NETWORK
Filed Oct. 25, 1948  3 Sheets-Sheet 3

INVENTOR
JOSEPH W. WHITELEY
By Ralph B. Stewart
Attorney

Patented May 29, 1951

2,554,932

UNITED STATES PATENT OFFICE 2,554,932

ELECTRICAL BRIDGE NETWORK

Joseph William Whiteley, London, England, assignor to A. C. Cossor Limited, London, England, a company of Great Britain Application October 25, 1948, Serial No. 56,461
In Great Britain October 31, 1947

5 Claims. (Cl. 175—183)

The present invention relates to electrical bridge networks.

The measurement of many physical quantities by means of a varying electrical impedance connected in a bridge network is already well known. Thus, for example, in order to measure the gas pressure in the cylinder of an internal combustion engine, a pressure-sensitive capacity pick-up device has been used in combination with a measuring bridge, energised at radio frequencies, to provide an electrical signal representing cyclic pressure changes in the cylinder. Similarly, a variable resistance has been used in a bridge circuit as a strain gauge in measuring vibrations and steady mechanical displacements.

It is generally desirable and often essential to provide a flexible coupling in the form of a cable between the measuring apparatus and an impedance being measured. Also, it is frequently advantageous or necessary to earth one terminal of this impedance.

A bridge system in which a flexible cable, comprising a single conductor with an inner screen and an outer screen, is used for the connection of measuring apparatus to a grounded remote impedance is already known.

It has been found that when a cable is used for connecting into a bridge network an element whose impedance is to be measured appreciable errors in measurement may result if the cable is exposed to mechanical strain, vibration or temperature changes. The magnitude of these errors tends to increase when the length of the cable is increased or when the frequency of the bridge-energising source is raised. Thus, in measuring high frequency vibrations it is necessary to apply a radio frequency carrier to the bridge and if the length of cable is not negligibly small in comparison with the carrier wavelength considerable errors may arise. The chief source of these errors lies in the variations of the distributed capacitances in the cable.

Another source of error in such measurements arises in the construction of the pick-up devices. For example, capacity pick-ups are prone to error as a result of changes in the insulating materials used therein which, although not affecting the direct capacitance between the electrodes, nevertheless changes the capacitive or other impedances between the individual electrodes and a screen associated with the pick-up. Again, in making measurements on a rotating body, such as an engine shaft, the connections between the pick-up device and the measuring apparatus generally include slip-rings and brushes. Insulation leakage and variable capacitances between adjacent slip-rings may produce serious errors.

The principal object of the present invention is to provide an improved bridge network in which the aforesaid errors are substantially reduced.

The invention makes use of a known bridge network of the type comprising two closely-coupled inductive ratio arms.

A known advantage of bridge networks of this type is that they can be arranged in such a manner that when used to measure the impedance between a first and a second terminal of a three-terminal mesh network, the impedances between the first and third, and the second and third terminals respectively of the mesh network have but little effect on the accuracy of measurements made by the bridge.

By arranging that the self-capacitances of a cable connector, for connecting an impedance element into a bridge network, are connected between the first and third and second and third terminals of a three-terminal mesh network having the impedance element connected between the first and second terminals thereof, the aforesaid known advantage can be obtained.

According to the present invention, therefore, an alternating current bridge network comprises two closely-coupled inductive ratio arms, a cable connector for connecting into a third arm of the bridge an element whose impedance is to be measured, a balancing impedance connected in the fourth arm of the bridge, terminals for applying an energising voltage to the bridge, and terminals for connecting a balance-indicating device to the bridge, the cable connector including two independently-screened conductors whose screens are connected to one another whereby there is formed a three-terminal mesh network whose terminals are points on the two conductors respectively and the said connected screens, and means being provided for connecting the three-terminal mesh network to the bridge in such a manner that variations in the impedances between the two conductors and the screens have substantially no effect on the accuracy of measurements made by means of the bridge.

According to a preferred form of the invention the cable connector has a third screen surrounding but insulated from the said connected screens, and a connection between the third screen and one of the conductors, whereby the impedance between the first said screens and the third screen is in parallel with the impedance between the said one of the conductors and its independent screen.

The invention also provides an alternating current bridge network comprising two ratio arms including respectively two closely-coupled inductance elements, a cable connector for connecting into a third arm of the bridge an element whose impedance is to be measured, a balancing impedance connected in the fourth arm of the bridge, and two pairs of terminals for connecting an energising source and a balance-indicating device respectively to the bridge, a first of the pairs of terminals being connected across the whole or a part of one of the ratio arms, the cable connector comprising two independently-screened conductors whose screens are connected to one another and to one terminal of said first pair, one conductor being connected to the other terminal of said first pair, and the arrangement being such that the impedance between the other conductor and its screen is effectively across one diagonal of the bridge.

Figure 2:
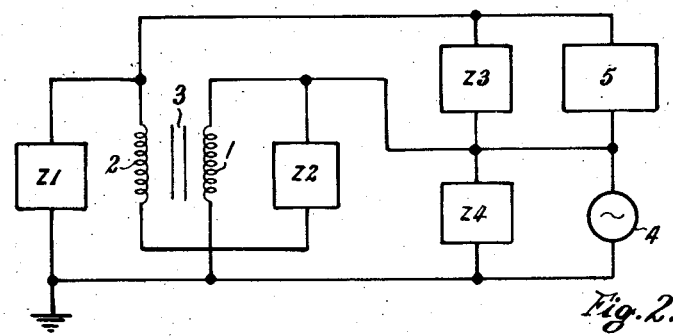

Five embodiments of the invention will now be described, by way of example, with reference to the accompanying drawings, in which Figs. 1 and 2 are schematic diagrams of two examples respectively of bridge networks of the type specified, and Figs. 3 to 7 are schematic diagrams of the five embodiments respectively, each of which includes a bridge network according to Figs. 1 or 2.

In Figure 1, two closely coupled inductive ratio arms 1 and 2 are employed to balance a variable balancing impedance $Z_2$ against an impedance $Z_1$ which it is desired to measure. The ratio arms 1 and 2 preferably consist of a bifilar winding on a high permeability magnetic core 3. Alternating current from a generator 4, operating at audio or radio frequency, is applied directly to the ratio arm 1 and is also applied via impedances $Z_1$ and $Z_2$ to the ratio arm 2, the direction of winding being such that the current through a detector 5 can be reduced to zero by adjustment of the impedance $Z_2$. When suitable windings are employed for the ratio arms 1 and 2, this state of balance will occur when $Z_2$ is approximately equal to $Z_1$.

When it is desired that the bridge balance should correspond closely with equality between the impedance $Z_1$ and $Z_2$ a compensating impedance may be inserted in series with impedance $Z_1$ to balance the leakage impedance of the ratio arms.

With the arrangement of Fig. 1 impedances $Z_3$ and $Z_4$ may be placed in shunt with the detector and the generator respectively without disturbing the balance of the bridge, although they will affect the sensitivity with which the detector can respond to small changes in either the impedance $Z_1$ or the impedance $Z_2$ when the bridge has been adjusted to balance. The arrangement of the three impedances $Z_1$, $Z_3$ and $Z_4$ constitutes a three-terminal mesh network.

The bridge system of Figure 2 may be derived from that shown in Figure 1 by a simple interchange of the ratio arm 2 and the impedance $Z_2$. The basic principle of operation is the same in both arrangements but certain advantages are obtainable with the system shown in Figure 2. Thus, in using a bifilar winding for the ratio arms 1 and 2, there is a difficulty in providing sufficient insulation between the conductors of the windings since in the circuit of Figure 1 the full generator voltage will be applied between adjacent conductors. In the circuit of Figure 2 the voltage between adjacent conductors in a bifilar winding will be very much less than the generator voltage when the bridge is adjusted near to the balance condition. Similarly, the effects of the distributed capacitance between the bifilar windings are greatly reduced when the arrangement of Figure 2 is employed.

When a ground connection is applied to one terminal of the impedance to be measured $Z_1$, as indicated in Figures 1 and 2, there is a difficulty in providing an electrostatic screen for the variable impedance $Z_2$ in the case of the system of Figure 1 since a stray capacitance from the junction of impedances $Z_1$ and $Z_2$ to ground would cause an error. In the system of Figure 2 this error is avoided, the reason for this being that in the circuit of Figure 2 one terminal of impedance $Z_2$ is connected to the generator, so that a capacitance from this point to ground is in shunt with the impedance $Z_4$ and therefore is not liable to introduce an error, while the other terminal of $Z_2$, which is connected to ratio arm 2, is approximately at ground potential when the bridge is balanced, so that a capacitance from this point to ground is in shunt with the impedance $Z_4$ and therefore is not liable to introduce an error, while the other terminal of $Z_2$, which is connected to ratio arm 2, is approximately at ground potential when the bridge is balanced, so that a capacitance from this point to ground will not appreciably disturb the balance.

In a bridge network as shown in Figure 2 it is sometimes advantageous to connect the detector 5 between the lower ends of the ratio arms instead of the upper ends as shown. When this alteration is made, the balance will not be completely independent of the impedance $Z_3$ but the errors caused by $Z_3$ may be reduced by employing ratio arms which have a very low leakage impedance. In the network shown in Fig. 2 the balance of the bridge can be made to correspond closely with equality between the impedances $Z_1$ and $Z_2$ if a compensating impedance is inserted in series with the impedance $Z_1$ to balance the leakage impedance of the ratio arms. When the detector 5 is connected across the lower ends of the ratio arms this compensating impedance is inserted in series with the impedance $Z_2$.

Another variation of the basic circuit of Figure 2 has the advantage that the bridge balance corresponds closely with equality between the impedances $Z_1$ and $Z_2$ without requiring the addition of a compensating impedance. This variation consists in connecting the detector 5 across the mid points of the ratio arms.

It is well known that, in general, one may interchange the detector and the generator in a bridge network without altering the basic principle of the circuit. In the present case one may effect this interchange in both figures. It is then found, however, that the circuit of Figure 2 loses some of its advantages over the circuit of Figure 1.

Figure 3:
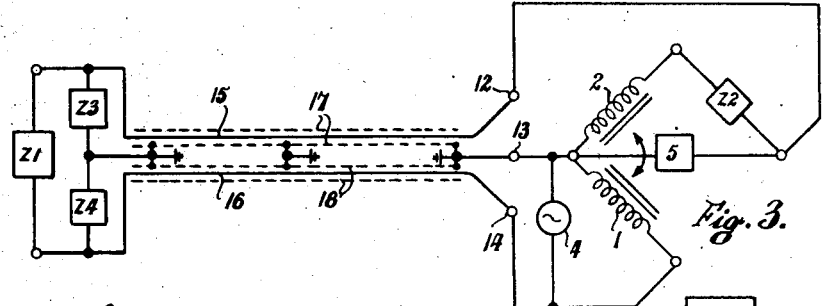

In Figure 3, the impedance $Z_1$ to be measured is connected by means of a cable connector comprising two conductors 15 and 16, independently screened by two screens 17 and 18 respectively, to measuring apparatus comprising the tightly-coupled inductive radio arms 1 and 2, the variable balancing impedance $Z_2$, the energising source 4 and the indicator 5.

The screens 17 and 18 are short-circuited to one another and to earth as shown, and in addition a connection is provided from these screens to the junction of the ratio arms 1 and 2. The impedances existing between the conductors 15 and 16 and their respective screens 17 and 18 are represented by $Z_3$ and $Z_4$.

It will be seen from the drawing that the impedance $Z_3$ is in shunt with the indicator 5 and that the impedance $Z_4$ is in shunt with the generator 4. Hence variations in $Z_3$ and $Z_4$ have substantially no effect on the balance of the bridge.

Figure 4:
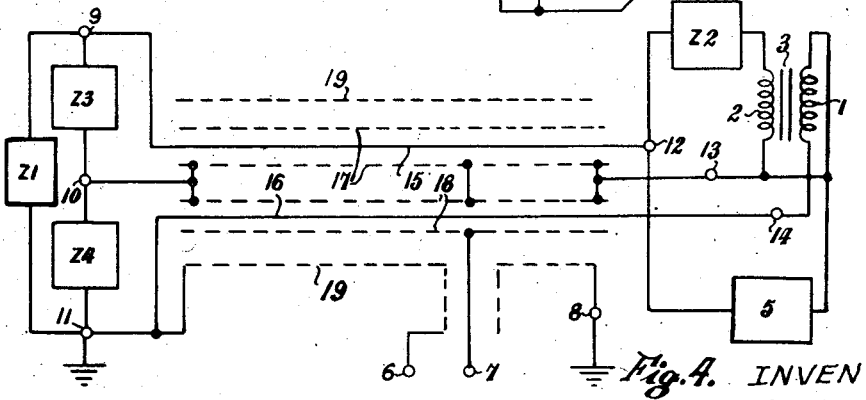
Figure 1:
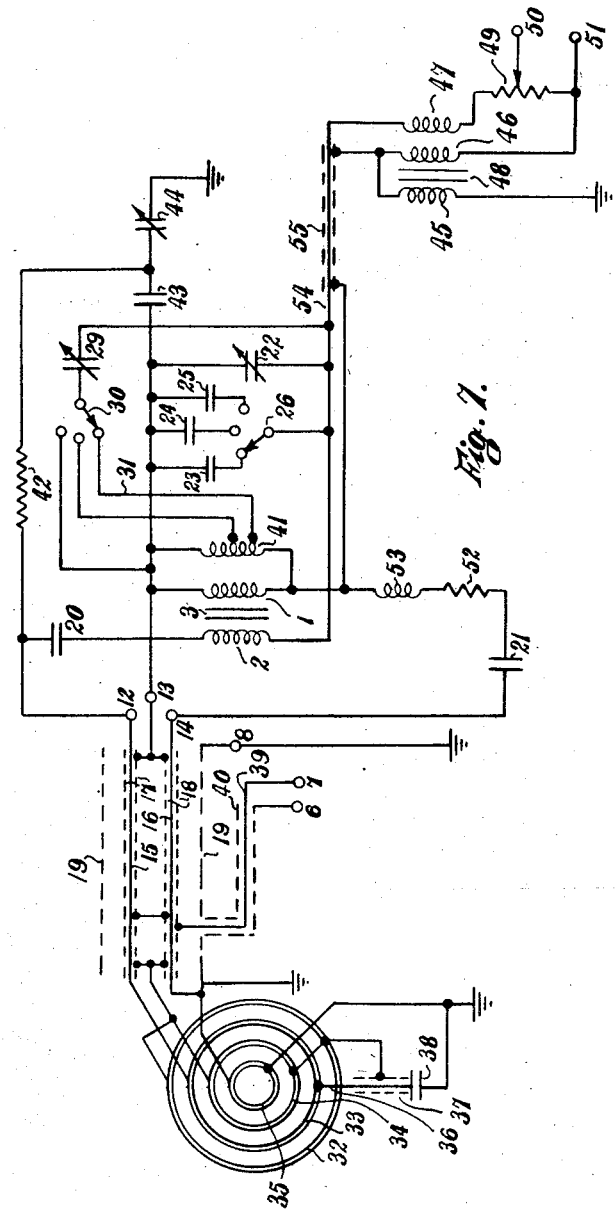

In Figure 4, the impedance $Z_1$ to be measured is connected by means of a flexible cable comprising the two conductors 15 and 16, the screens 17 and 18, and an outer screen 19 to the measuring apparatus consisting of the closely coupled inductive ratio arms 1 and 2, the variable balancing impedance $Z_2$, and the detector 5. In addition, terminals 6 and 7 are provided for connection to the generator 4 of alternating current at audio or radio frequency, while a terminal 8 is provided for a ground connection to the outer screen 19 in the neighbourhood of the measuring apparatus. Terminal 8 may also be connected to a screening box (not shown) enclosing the measuring apparatus and may also be further connected to a screening box enclosing the generator 4. The generator terminals 6 and 7 are connected as shown to the outer screen 19 and the inner screens 17 and 18 which although still connected together are not earthed. The inner screens 17 and 18 are connected together at the ends of the cable as well as in the vicinity of the connection to the terminal 7. Alternatively, the cable may be constructed so that the inner screens 17 and 18 lie in contact with each other throughout the length of the cable. It is important that the inner screens 17 and 18 should be well insulated from the conductors 15 and 16 and from the outer screen 19. It is also important that the inner screens 17 and 18 should provide effective electrostatic screening between each of the conductors 15 and 16, and the outer screen 19, while also screening the conductors 15 and 16 from each other. In addition, it is important that the resistance of the screens 17 and 18 should be negligibly small. The outer screen 19 may consist of a metallic sheath or braid enclosing the conductors 15 and 16 together with their screens 17 and 18. Alternatively, each conductor 15 and 16 may be provided with an inner screen and an outer screen, in which case the two outer screens are connected in parallel so as to be equivalent to the single outer screen 19 shown in Figure 4.

In the vicinity of the remote impedance $Z_1$, the conductor 15 is connected to terminal 9 which is the live terminal of impedance $Z_1$; conductor 16 and outer screen 19 are both connected to terminal 11 which is the ground terminal of impedance $Z_1$, while the inner screens 17 and 18 are connected to terminal 10. The impedance $Z_3$ connected between terminals 9 and 10 comprises the impedance existing between the conductor 15 and the screen 17. Similarly, an impedance $Z_4$ connected between terminals 10 and 11, comprises the impedance existing between the conductor 16 and screen 18.

In the vicinity of the measuring apparatus, the conductor 15 is connected to a terminal 12, to the variable balancing impedance $Z_2$, and to the detector 5; the conductor 16 is connected to a terminal 14 and to the ratio arm 1; the inner screens 17 and 18 are connected to a terminal 13, to the detector 5 and to the ratio arms 1 and 2.

In the operation of a bridge system of this type, the application of a generator voltage between the terminals 6 and 7 will cause a voltage to appear between the terminals 10 and 11, this voltage being generally unequal to the generator voltage and liable to change in magnitude and phase when variations occur in the impedance $Z_4$. Similarly, the voltage between terminals 10 and 11 will be liable to change appreciably if the cable is subjected to mechanical strain or temperature change, since variations in the distributed capacitance between the inner screens 17 and 18 and the outer screen 19 will have a similar effect as variations in the impedance $Z_4$.

Terminals 10 and 11 correspond with the terminals of the generator 4 in Figure 1. From terminal 10 in Figure 4 a current flows via the inner screens 17 and 18 to the terminal 13. Part of this current flows through the ratio arm 1 to the terminal 14 and thence to terminal 11 via conductor 16. Another part of the current from terminal 13 flows through ratio arm 2 and impedance $Z_2$ to terminal 12 and then via conductor 15 to terminal 9 and through impedance $Z_1$ to terminal 11. In addition, a current will flow through the distributed capacitance existing between conductor 16 and screen 18, but no current will flow in the distributed capacitance between conductor 15 and screen 17 when the bridge is balanced, provided that the reactance of the conductor 15 in its screen 17 is negligibly small compared with the impedance $Z_1$ and provided that the resistance of the inner screens 17 and 18, in parallel, is negligibly small compared with the impedance $Z_4$ in parallel with the impedance existing between the inner screens (17 and 18) and the outer screen 19 by virtue of the distributed capacitance between them. Thus, when the bridge is balanced, no current will flow through the detector 5 and no current will flow through impedance $Z_3$. Variations in the impedance $Z_3$ therefore have no disturbing effect on the balance condition. On the other hand, variations in the impedance $Z_4$ have no effect on the balance condition for the reason that they have an equal effect on the currents in impedances $Z_1$ and $Z_2$.

In some practical applications of bridge systems of this type, there is little difficulty in obtaining a sufficiently low resistance in the inner screen circuit and in these cases it is generally immaterial at what point along the cable the connection of terminals 6 and 7 is made. The connection may then be made in the neighbourhood of terminals 8, 12, 13 and 14 so that the generator lead will be short. When the resistance of the inner screen circuit is appreciable, so that variations of the impedance $Z_4$, or variations of impedances within the cable, begin to have a serious effect on the balance condition, then a considerable improvement is obtainable by moving the connections of terminals 6 and 7 to a position near to terminals 10 and 11. Alternatively, the generator may be applied directly across terminals 10 and 11.

When the reactance of the conductor 15 is appreciable in comparison with the impedance $Z_1$ it is found that the current in impedance $Z_3$ reaches zero when the impedance $Z_2$ is adjusted to a slightly different value from that which corresponds with zero current in the detector 5. Thus with one adjustment, the bridge is insensitive to variations of impedance $Z_3$ and with the other adjustment the bridge is insensitive to variations of impedance $Z_4$. Further means to avoid this effect will be later described.

As already described with reference to Figure 1 a compensating impedance may be inserted to make the bridge balance correspond closely with equality between impedances $Z_1$ and $Z_2$ so as to balance the error caused by the leakage impedance of the ratio arms. It is to be noted that the reactance and resistance of the inner conductors 15 and 16 will not disturb the balance condition if the two concentric lines are balanced. Thus the conductor 16 and screen 18 should be as nearly as possible identical with the conductor 15 and screen 17. This object is readily secured in practice by using two equal lengths of concentric cable and twisting them together before applying the outer insulation and the grounded outer sheath 19.

With reference to Figure 5, the arrangement and operation are the same as described with reference to Figure 4 except that the relative positions of impedance $Z_2$ and ratio arm 2 are interchanged. As a result of this change, the system of Figure 5 exhibits advantages over that of Figure 4 as previously described with reference to Figure 2.

The arrangement shown in Figure 5 may be modified as already described with reference to Figure 2. Thus the detector 5 may be connected across the lower ends of the ratio arms or across their mid-points.

When it is desired to measure a simple two-terminal impedance such as $Z_1$ alone, then the terminal 10 in Figures 4 and 5 becomes redundant. In this case, no connection need be brought out from the screens 17 and 18 at the end of the cable adjoining the remote impedance $Z_1$. It is however desirable that the conductor 15 should not be exposed to stray capacitance to ground. The screen 17 should therefore project as far as possible up to the terminal 9 of impedance $Z_1$.

In some applications, the systems described with reference to Figures 4 and 5 may prove unsatisfactory since it may be difficult to reduce the reactance of conductor 15 and the resistance of the screens 17 and 18 to sufficiently low values to obtain a desired high degree of immunity from the effects of variations in impedances $Z_3$ and $Z_4$ and the effects of changes of impedances within the cable. In order to overcome these difficulties, an arrangement such as that shown in Figure 6 may be employed. This arrangement includes means for avoiding the undesired effects caused by the reactance of conductor 15. For this purpose, a condenser 20 is inserted in series with the conductor 15 so as to neutralise the reactive voltage drop in conductor 15. A condenser 21 is also inserted in series with conductor 16 so that the bridge will be balanced when the impedance $Z_2$ is equal to the impedance $Z_1$.

In order to determine the required values of the capacitance of this condenser 20, one may measure the impedance across terminals 9 and 10 by means of a voltmeter connected across terminals 9 and 10 while the detector 5 is short-circuited. The value of capacitance 20 may then be adjusted to give a minimum voltage. With this value inserted and the normal connections restored, one may adjust the value of the capacitance 21 until detector 5 indicates a balance with equal values for the impedances $Z_1$ and $Z_2$. In this way the conductor 15 is tuned to resonance with capacitance 20 while the capacitance 21 is made resonant with conductor 16 in series with the leakage inductance of the ratio arms. By applying this method it is practicable to increase the length of the cable to the region of 5% to 10% of the wavelength of the generator.

Alternatively, condensers 20 and 21 may have equal capacitance so as to resonate the reactance of conductors 15 and 16 while a compensating impedance is inserted to balance the leakage impedance of the ratio arms. When the detector 5 is connected across the upper ends of the ratio arms, as shown in Figure 6, this compensating impedance may be inserted between terminal 12 and the condenser 20. When the detector 5 is connected across the lower ends of the ratio arms the compensating impedance may be inserted between terminal 14 and the junction of ratio arm 1 with detector 5.

When the condenser 21 is inserted in the remote termination of conductor 16, as indicated in Figure 6, it is possible to adjust the circuit so that the value of impedance $Z_2$ will indicate the true value of impedance $Z_1$ with a high degree of accuracy over a wide range. It is generally more convenient, however, to insert the condenser 21 in series with conductor 16 in the vicinity of the terminal 14, the result being that the balance condition requires a constant ratio between the values of the impedance $Z_1$ and $Z_2$.

A further embodiment of the invention is shown in Figure 7 in which 38 represents a capacity pick-up mounted on a rotating shaft (not shown). The pick-up 38 has one terminal connected to ground via the shaft and again via a slip-ring 35 and a brush connection to the remote end of the outer screen 19 of a flexible cable. The live terminal of the pick-up 38 is connected via a screened lead 36 to a slip-ring 33 which is connected by a brush to the remote end of conductor 15. Lead 36 is provided with a screen 37 which is connected to rings 32 and 34 in parallel. The rings 32 and 34 are placed adjacent to ring 33 so that direct capacitance and insulation leakage from ring 33 to ring 35 or to ground, is avoided. The rings 32 and 34 thus serve as guard electrodes and are connected via brushes to inner screens 17 and 18 in parallel. The impedance existing between ring 33 and the two guard rings thus takes the place of the impedance $Z_3$ of Figures 5 and 6, while the impedance between the guard rings and ground replaces the impedance $Z_4$.

Conductor 15 is connected via terminal 12 to a condenser 20 in series with ratio arm 2. Conductor 16 is connected via terminal 14 through a condenser 21, a resistance 52, and an inductance 53 to ratio arm 1. In place of the variable balancing impedance $Z_2$ in Figures 5 and 6, variable condenser 22 is connected in shunt with a fixed condenser such as 23, 24 or 25 selected by a switch 26. The detector circuit is connected between the junction of ratio arm 2 with condenser 22 and the junction of ratio arm 1 with inductance 53. Thus the detector is connected across the lower ends of the ratio arms. In the present example, a screened lead 54, 55 is employed to feed a differential output transformer comprising a primary winding 45, and two secondary windings 46 and 47 on a high permeability magnetic core 48. Preferably, a transformer for this purpose is constructed by first twisting three lengths of insulated wire together and then winding them to form a coil. In this way the secondary windings 46 and 47 are equally coupled to the primary 45 so that no voltage will appear across a gain control 49 connected across the lower ends of windings 46 and 47 when there is no voltage between conductors 54 and 55, notwithstanding that there may be a considerable voltage across the primary 45. From the gain control 49 an output signal is taken via terminals 50, 51 to an amplifier (not shown). Thus the terminal 50 may be connected to the grid of an amplifier valve while terminal 51 may be connected to the cathode. Alternatively, such an amplifier may be connected to the screened output lead 54, 55 through a screened transformer of known type.

A resistance 42 is connected between terminal 12 and the junction of condensers 43 and 44 so as to provide a means of balancing a small quadrature voltage which appears between terminals 12 and 13 as a result of the resistance of the inner screens 17 and 18. Alternatively, a variable resistance could be employed, and could be connected, for example, across terminals 12 and 14. Adjustment of condenser 44 also provides a convenient means for balancing the bridge when the power factor of the pick-up 38 is different from the power factor of the balancing condenser 22 together with fixed condenser 23, 24 or 25.

Condensers 20 and 21 are chosen to resonate the reactance of conductors 15 and 16 as already described with reference to Figure 6. The resistance 52 and inductance 53 are adjusted to balance out the leakage inductance and resistance of the ratio arms so that the value of capacitance 22 required to balance the bridge is accurately proportional to the capacitance of the pick-up 38 over a wide range.

In order to provide a means for calibrating small changes of capacitance in the pick-up a variable condenser 29 is connected via a switch 30 to a tapping such as 31 on a winding 41 which may be wound on the same magnetic core 3 as the ratio arms 1 and 2. Alternatively, a separate magnetic core may be used. Switch 30 is employed as a range multiplier for the variable condenser 29.

Terminals 6 and 7 are provided for the connection of a generator. These terminals are connected via conductor 39 and grounded screen 40 to the inner screens 17 and 18 and the outer screen 19.

Typical values of components for use with this embodiment when the capacitance 38 lies between 100–800 pF are as follows:

| Resistors | Capacitors | Transformer 3 |
|---|---|---|
| 42—6.8KΩ. | 20—27,000pF. | Windings 1, 2 and 41 are each of 50 turns bifilarly wound on a "Mumetal" core R. C. S. C. No. 423 of TCM 40T laminations .004″ thick. |
| 49—2KΩ. | 21—27,000pF. | |
| 52—1Ω. | 22—200pF (variable). | |
| | 23—200pF. | |
| *Inductances* | 24—400pF. | |
| | 25—600pF. | *Transformer 48* |
| 53—1μH. | 29—50pF (variable). | |
| | 43—820pF. | Windings 45, 46, 47 are each of 140 turns on a similar core. In transformers 3 and 48 wires are twisted together before winding. |
| | 44—100pF. | |

These values are for a generator frequency of 300 kc./s. using a 100 foot length cable having the following characteristics:

Total capacitance between each inner conductor and its inner screen (each) ___pF__ 3000
Total capacitance between inner and outer screens _____pF__ 8500
Total resistance of each inner conductor _____ohm__ 1.0
Total resistance of each inner screen _____do____ 0.09
Total resistance of each outer screen _____do____ 1.0

I claim:

1. An alternating current bridge network comprising two terminals and a cable connector for connecting into a first arm of the bridge an element whose impedance is to be measured, two closely-coupled inductive ratio arms having one end of each connected to said terminals respectively, a fourth arm connected between the other ends of said ratio arms, said fourth arm including a balancing impedance, terminals for connecting a balance-indicating device between said ratio arms, said cable connector comprising two conductors connected respectively to the first said terminals, and two screens independently screening said conductors, means for connecting said screens to one another and to the junction of one of said ratio arms with said fourth arm, and terminals for connecting an energising source to one of said conductors and said screens.

2. An alternating current bridge network comprising two closely-coupled inductance elements connected respectively in two ratio arms of the bridge, a balancing impedance connected in a third arm of the bridge, a first pair of terminals for the fourth arm of the bridge, the terminals of said first pair being connected to said ratio arms respectively, a cable connector for connecting to said first pair of terminals an element whose impedance is to be measured, second and third pairs of terminals for connecting an energising source and a balance-indicating device respectively to the bridge, one of the last said pairs of terminals being connected across at least a part of one of said ratio arms, and said second and third pairs of terminals having a common terminal and said cable connector comprising two conductors and independent electrostatic screens respectively surrounding said conductors, means for connecting said screens to one another and to the common terminal of said second and third pairs of terminals and two capacitors connected respectively in series with said conductors for counteracting the inductive reactance thereof.

3. An alternating current bridge network comprising two closely-coupled inductance elements connected respectively in two ratio arms of the bridge, a balancing impedance connected in a third arm of the bridge, a first pair of terminals for the fourth arm of the bridge, the terminals of said first pair being connected to said ratio arms respectively, a cable connector for connecting to said first pair of terminals an element whose impedance is to be measured, second and third pairs of terminals for connecting an energising source and a balance-indicating device respectively to the bridge, one of the last said pairs of terminals being connected across at least a part of one of said ratio arms, said second and third pairs of terminals having a common terminal, and said cable connector comprising two conductors, independent inner electrostatic screens respectively surrounding said conductors, and an outer electrostatic screen surrounding said conductors, means for connecting said independent screens to one another and to said common terminal of said second and third pairs of terminals, means connecting said outer screen of said cable connector to one of said conductors, and a correcting network connected between the first said pair of terminals for counteracting the effects of the resistance of said inner screens.

4. An alternating current bridge network for measuring the impedance of one branch $Z_1$ of a three-terminal mesh network having two further branches $Z_3$ and $Z_4$, comprising two terminals for connecting said branch $Z_1$ into a first arm of the bridge, two closely-coupled ratio arms having one end of each connected to said terminals respectively, a fourth arm connected between the other ends of said ratio arms, said fourth arm comprising a balancing impedance $Z_2$, terminals for connecting an energizing source effectively across one diagonal of the bridge, and terminals for connecting a balance-indicating device across the other diagonal of the bridge, said energizing source and balance-indicating device having a common terminal for connection to the junction of said branches $Z_3$ and $Z_4$ of said three-terminal mesh network.

5. An alternating current bridge network comprising two terminals and a cable connector for connecting into a first arm of the bridge an element whose impedance is to be measured, two closely-coupled inductive ratio arms having one end of each connected to said terminals respectively, a fourth arm connected between the other ends of said ratio arms, said fourth arm including a balancing impedance, terminals for connecting a balance-indicating device between said ratio arms, said cable connector comprising two conductors connected respectively to the first said terminals, two inner screens independently screening said conductors, and an outer screen surrounding said inner screens, means for connecting said inner screens to one another and to the junction of one of said ratio arms with said fourth arm, a connection between said outer screen and one of said conductors, and terminals for connecting an energizing source between the last said conductor and said inner screens, the last said conductor being connected to the last said ratio arm.

JOSEPH WILLIAM WHITELEY.

REFERENCES CITED

The following references are of record in the file of this patent:

FOREIGN PATENTS

| Number | Country | Date |
|---|---|---|
| 581,164 | Great Britain | Oct. 3, 1946 |